C. B. KIRKHAM.
AERIAL PROPELLER FASTENING.
APPLICATION FILED OCT. 13, 1916.
1,246,023.
Patented Nov. 6, 1917.
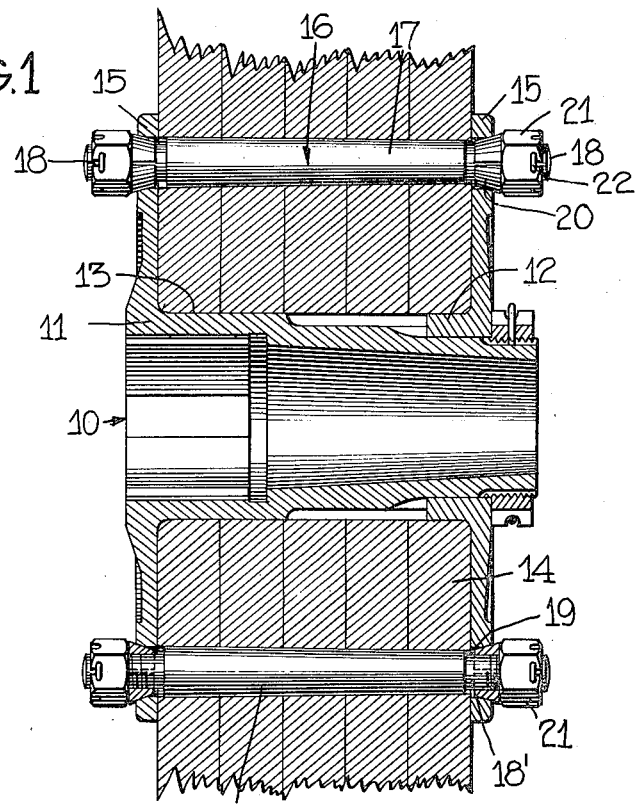
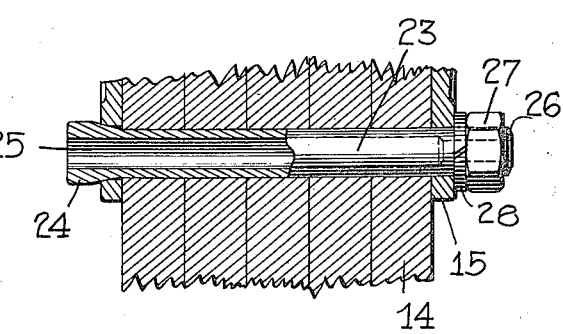
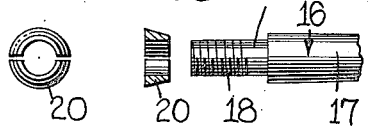
Inventor
CHARLES B. KIRKHAM.
By
Attorney

UNITED STATES PATENT OFFICE.

CHARLES B. KIRKHAM, OF BUFFALO, NEW YORK, ASSIGNOR TO CURTISS AEROPLANE AND MOTOR CORPORATION, A CORPORATION OF NEW YORK.

AERIAL-PROPELLER FASTENING.

1,246,023.   Specification of Letters Patent.   Patented Nov. 6, 1917.

Application filed October 13, 1916. Serial No. 125,525.

*To all whom it may concern:*

Be it known that I, CHARLES B. KIRKHAM, a citizen of the United States, residing at Buffalo, in the county of Erie and State of New York, have invented certain new and useful Improvements in Aerial-Propeller Fastenings, of which the following is a specification.

My invention relates broadly to new and useful improvements in hub fastenings of the type employed in connection with aerial propellers. More specifically the invention may be said to include rigidly embedded retaining elements which extend laterally beyond the opposite faces of the hub section of the propeller and devices mounted upon the terminals of said elements to secure a rigid connection between said elements of the propeller hub.

It has heretofore been customary in propeller construction to drill in the hub section of the propeller a plurality of holes into which are inserted the retaining bolts for the propeller hub. From the hub, carried by the motor crank shaft, motion is transmitted to the wooden hub section of the propeller body. Hence it is at this point— *i. e.* the hub section, that the maximum of strength is required. Especially is this true as the size of the propeller is increased with an increase in the driving power.

Ofttimes, however, under the above conditions, a slight amount of play between the metallic hub and the wooden hub section exists. Under irregular operations of the driving motor this play greatly increases until the inertia and vibrational strains are sufficient to split the propeller at the hub. The dangerous effects resulting from a split or shattered propeller are well known. I therefore aim to overcome the above and similar defects.

The principal characteristic of the invention is in the utilization of one or more bolts threaded on both ends and having an enlarged but tapered body making a drive fit with the propeller hub whereby to form a rigid part thereof. After having obtained a drive fit for the retaining bolts the hub face-plates or flanges are fitted over them and the bolt holes therein reamed with the bolt axes as centers. Split tapered lining washers are then placed in the reamed holes and nuts tightened firmly down on the washers with the result that the latter are forced into clamping engagement with the heads of the bolts themselves and the several elements, including the hub section, made a rigid unified whole. While applicable particularly to wooden laminated aerial propellers it is to be understood that I do not wish to limit myself except in so far as the broadest interpretation of the claims compel.

In describing my invention in detail reference will be had to the accompanying drawings wherein like characters of reference denote like or corresponding parts throughout the several views, of which;

Figure 1 is a longitudinal section of a propeller hub and the adjacent hub section of the propeller body. This view illustrates in detail the preferred form of hub fastening means.

Fig. 2 is an elevation of a portion of one of the hub face-plates or flanges.

Fig. 3 illustrates, detached and in detail, the several elements which constitute the hub fastening means, and Fig. 4 is a fragmentary section illustrating a modified fastening means.

The propeller hub, designated in its entirety by the numeral 10, is preferably made up of connected sections 11 and 12 of a construction designed for fitting engagement in an opening 13 formed in the hub section 14 of the propeller body. Integral face-plates or flanges 15 extend outwardly from the connected hub sections for contact with opposite lateral faces of the propeller. This construction is only preferred, however, and may be considerably modified without departing from the spirit of the invention disclosed.

Because of the character of the wood used in the manufacture of laminated wooden aerial propellers it is impractical to secure a drive fit for the retaining bolts without first drilling a hole for each bolt of a size diametrically smaller than the diameter of the retaining bolt at its reduced end. Any attempt to drive the retaining bolts into the hub section of the propeller without first drilling the bolt holes would in all probability cause the propeller hub to split. These retaining bolts, of which any number may be used, are designated each as an entirety by the numeral 16.

Each bolt 16 is provided with a slightly tapered body 17 and oppositely threaded reduced terminals 18 of sufficient length to extend considerably beyond the opposite lateral faces of the propeller body. The retaining bolts are in this way made a rigid part of the propeller body and even the slightest relative movement thereof with respect to said body avoided.

Having obtained a drive fit for the retaining bolts the hub face-plates or flanges 15 are fitted over the body terminals 18. The holes 19 through which the terminals ultimately extend are then reamed with the axes of the bolts 16 or rather the bolts 16 themselves acting as centers. In this way a true lining up of the hub sections 11 and 12 is obtained.

After reaming the holes in the face-plates to the desired size, split tapered lining washers 20 are fitted or placed in them (around the reduced bolt terminals 18) and nuts 21 tightened firmly down on the washers with the result that the latter are forced into clamping engagement with the heads of the bolts themselves and the several elements thus made a rigid unified whole. Subsequent to adjustment of the nuts 21 appropriate nut locking means 22 are used.

It will be observed upon reference to Fig. 3 that that area of the reduced terminals 18 next adjacent the shoulder is free of threads as indicated at 18' to permit of a clean positive frictional grip of the washers 20. By this arrangement a better grip and consequently a perfectly rigid fastening is obtained.

In the modified form of fastening means illustrated in Fig. 4 the retaining bolts 23 are made with an enlargement 24 at one end and hollow as at 25 throughout, the diameter of the bore at the opposite end of the bolt from that enlarged as at 24 being reduced. Exterior threads 26 are formed at this end of the bolt for the reception of a nut 27. By tightening the nut upon the bolt the enlarged end 24 thereof is drawn into positive engagement with its associated face-plate and the opposed face-plates secured, with the hub section of the propeller clamped firmly therebetween. A split washer 28 (untapered) should be interposed between the nut 27 and the face-plate adjacent to it.

By reaming the holes 19 with the bolt axes as centers a perfect lining up of the associated parts is obtained. It will also be noted that the holes 19 in part correspond in form with the tapered washers 20. Such a construction will cause the washers to contact as the nuts 21 are forced home.

Although I have described more or less precise forms and details of construction, I do not intend to be understood as limiting myself thereto, as I contemplate changes in form, the proportion of parts and the substitution of equivalents as circumstances may suggest or render expedient in the reduction of the invention to practice.

What I claim is:

1. A means for fastening the hub of a propeller to the hub section of the propeller body including a plurality of tapered retaining elements mounted to extend laterally beyond one face of the hub section of the propeller and means upon the extended terminals of said elements to secure a rigid connection between said elements and the propeller hub.

2. A means for fastening the hub of a propeller to the hub section of the propeller body comprising a plurality of tapered retaining bolts, each having a drive fit with the hub section and each having oppositely threaded terminals of a length to extend beyond the opposite lateral faces of the propeller whereby to engage with the propeller hub, and adjustable locking means mounted on the bolt terminals for clamping the propeller hub and the hub section of the propeller body together.

3. A means for fastening the hub of a propeller to the hub section of the propeller body comprising a plurality of tapered retaining bolts each having a drive fit with the hub section of the propeller body, terminal portions formed on each bolt to extend beyond the lateral faces of said hub section, and a means engaging the terminal portions of the retaining bolts to clamp the hub and the hub section of the propeller body together.

4. A means for fastening the hub of a propeller to the hub section of the propeller body comprising a plurality of retaining bolts mounted to extend laterally beyond the opposite faces of the hub section, an exteriorly threaded terminal portion formed on each retaining bolt for extension laterally beyond one face of said hub section through openings formed in the propeller hub, and split tapered washers adjustable upon the threaded terminal of each retaining bolt to clamp the propeller hub and the hub section of the propeller together.

5. A means for fastening the hub of a propeller to the hub section of the propeller body comprising a plurality of retaining bolts each having a drive fit with the hub section of the propeller, terminal portions formed upon each retaining bolt for extension laterally beyond the opposite faces of the hub section through openings formed in the propeller hub, split tapered washers carried by the terminal portions for fitting engagement in the openings of the propeller hub, and adjustable securing means mounted on the bolt terminals to engage the washers and clamp the propeller hub and the hub section of the propeller body together.

6. A means for fastening the hub of a propeller to the hub section of the propeller body comprising a plurality of tapered retaining bolts each having a drive fit with the hub section of the propeller, reduced threaded terminal portions formed on each bolt for extension beyond the opposite lateral faces of the propeller body, split tapered washers mounted on the terminal portions of the retaining bolts for fitting engagement in openings formed in the propeller hub through which the terminal portions extend, and adjustable locking means mounted on said terminal portions to engage with the washers and through such engagement maintain the washers against axial movement on the retaining bolts and the propeller hub in clamping engagement with the hub section of the propeller body.

7. A means for fastening the hub of a propeller to the hub section of the propeller body including retaining elements rigidly embedded in the hub section, each having a terminal portion threaded throughout a portion of its length, said terminal portions extending beyond the opposite lateral faces of the propeller and a means engaging the non-threaded portion of each terminal to secure a rigid connection between the propeller hub and the hub section of the propeller.

8. A means for fastening the hub of a propeller to the hub section of the propeller body including a plurality of retaining bolts, said hub section being provided with bolt holes of a diameter originally somewhat smaller than the diameter of the bolts, the diameter of the bolt holes being enlarged by the bolts in driving the bolts into the bolt holes so that the terminals thereof may extend laterally beyond the opposite faces of the hub section, said terminals extending through openings formed in the propeller hub, and means adjustable upon the terminals of the retaining bolts to clamp the propeller hub and the hub section of the propeller together.

In testimony whereof I affix my signature.

CHARLES B. KIRKHAM.